United States Patent [19]

Ellner

[11] Patent Number: 5,601,012
[45] Date of Patent: Feb. 11, 1997

[54] APPARATUS FOR BAKING BREAD BOWLS AND METHOD OF USE THEREOF

[76] Inventor: Joseph Ellner, 8549 N. Servite Dr. #105, Milwaukee, Wis. 53223

[21] Appl. No.: 523,261

[22] Filed: Sep. 5, 1995

[51] Int. Cl.[6] ................ A22C 7/00; A23P 1/00; A47J 43/18

[52] U.S. Cl. .............. 99/428; 99/432; 99/442; 99/DIG. 15; 249/DIG. 1; 249/120; 426/391

[58] Field of Search ............... 99/426, 428, 432, 99/439, 442, 383, DIG. 15; 249/DIG. 1, 115, 117, 119, 120; D7/354; 426/391, 138, 279, 280

[56] References Cited

U.S. PATENT DOCUMENTS

| | | | |
|---|---|---|---|
| D. 246,627 | 12/1977 | Sugiyama | D7/85 |
| 366,679 | 7/1887 | North . | |
| 1,191,672 | 7/1916 | Crosby | 99/DIG. 15 X |
| 1,852,966 | 5/1930 | Green . | |
| 3,831,507 | 8/1974 | Wheaton | 99/428 |
| 4,009,859 | 3/1977 | Bangert | 249/122 |
| 4,265,919 | 5/1981 | Munter et al. | 99/432 X |
| 4,653,392 | 3/1987 | Gerber | 99/439 |
| 4,929,458 | 5/1990 | Smietana | 426/391 |
| 5,232,609 | 8/1993 | Prevost et al. | 99/DIG. 15 X |
| 5,400,698 | 3/1995 | Savage | 99/439 |

FOREIGN PATENT DOCUMENTS

| | | | |
|---|---|---|---|
| 1168226 | 7/1989 | Jordan | 99/DIG. 15 |
| 8701629 | 2/1989 | Netherlands | 99/DIG. 15 |

*Primary Examiner*—Reginald Alexander
*Attorney, Agent, or Firm*—Nilles & Nilles, S.C.

[57] ABSTRACT

Systems and methods for baking bread bowls are described. A bread bowl baker includes a concavo-convex body including a wide diameter circumference and a narrow diameter circumference; a first end coextensively joined to the wide diameter circumference, the first end i) having an axially outermost extent that defines a first end plane and ii) including a nonplanar cylindrical flange that doubles back from the axially outermost extent to form a raised edge, the raised edge defining a raised edge plane that is noncoplanar with the first end plane; and a second end coextensively joined to the narrow diameter circumference, the second end defining a second end plane. The systems and methods provide advantages in that resulting bread bowls are of uniform shape and are uniformly baked.

18 Claims, 7 Drawing Sheets

APPARATUS FOR BAKING BREAD BOWLS AND METHOD OF USE THEREOF

BACKGROUND OF THE INVENTION

1. Field of the Invention

The present invention relates generally to the field of baking bread. More particularly, the present invention concerns apparatus and methods for baking bread bowls. The present invention thus relates to apparatus for baking of the type that can be termed bread bowl bakers and to methods of use thereof.

2. Discussion of the Related Art

Historically, it was known in the prior art to bake bread bowls. The prior art bread bowls are approximately semi-spherical loaves of hollow cavity bread. Salads or soup can be served in such bread bowls. The bread bowls themselves can also be consumed.

A conventional bread bowl is typically made by forming raw bread dough on top of a simple inverted bowl. The inverted bowl, together with the formed raw bread dough, is then placed in an oven for baking. However, bread bowls made in this simple manner are often deformed and/or unevenly baked. Also, bread bowls made in this manner often rise from the simple inverted bowl in a substantially spherically symmetrical manner resulting in a finished bread bowl that tips and rolls easily when it is placed on a plate or other presentation surface.

There are several additional problems involved with producing bread bowls. A first problem is that the raw bread dough needs to be formed symmetrically. A second problem is that when the formed raw bread dough is not symmetrical, excess raw bread dough needs to be trimmed away. A third problem is that heat needs to be evenly supplied to the bread dough while it is being baked. What is required therefore is an apparatus to permit the dough to be symmetrically formed, without the need for trimming, and then baked with an even supply of heat so as to result in a finished bread bowl that does not tip and roll. Heretofore, these requirements have not been fully met.

The below-referenced U.S. patents disclose embodiments that were at least in-part satisfactory for the purposes for which they were intended. The disclosures of all the below-referenced prior United States patents, and applications, in their entireties are hereby expressly incorporated by reference into the present application for purposes including, but not limited to, .indicating the background of the present invention and illustrating the state of the art.

U.S. Pat. No. 366,679 discloses a broiler. U.S. Pat. No. 1,852,966 discloses a baking pan. U.S. Pat. No. 3,831,507 discloses a baking pan assembly. U.S. Pat. No. 4,009,859 discloses a pan for baking hamburger rolls. U.S. Pat. No. 4,653,392 discloses a muffin baking pan for producing a muffin with an open cavity. U.S. Pat. No. 246,627 discloses a roasting pan.

SUMMARY OF THE INVENTION

It is therefore an object of the invention is to provide apparatus for baking a bread bowl that produces a uniform bread bowl that is resistant to tilting and rolling. Another object of the invention is to provide an apparatus that is ruggedized and reliable. Another object of the invention is to provide an apparatus that has one or more of the characteristics discussed above but which is relatively simple to manufacture and assemble using a minimum of equipment.

In accordance with a first aspect of the invention, these objects are achieved with a bread bowl baker comprising: a concavo-convex body including a wide diameter circumference and a narrow diameter circumference; a first end coextensively joined to said wide diameter circumference, said first end i) having an axially outermost extent that defines a first end plane and ii) including a nonplanar cylindrical flange that a) doubles back from the axially outermost extent to form a raised edge, said raised edge defining a raised edge plane that is noncoplanar with said first end plane and b) includes an outer perimeter that is at least partially cylindrical; and a second end coextensively joined to said narrow diameter circumference, said second end defining a second end plane; a widened end portion coextensively joined to said nonplanar cylindrical flange; and a plurality of handles adjacent said widened end portion, wherein said plurality of handles include a first integrally formed handle and a second integrally formed handle. In a preferred embodiment, the second end is substantially planar.

Another object of the invention is to provide apparatus for simultaneously baking a plurality of bread bowls. Another object of the invention is to reduce the per unit cost of producing a bread bowl.

In accordance with a second aspect of the invention, these objects are achieved with an apparatus for making bread bowls comprising: a plurality of bread bowl bakers, each of said plurality of bread bowl bakers including: a concavo-convex body including a wide diameter circumference and a narrow diameter circumference; a first end coextensively joined to said wide diameter circumference, said first end i) having an axially outermost extent that defines a first end plane and ii) including a nonplanar cylindrical flange that doubles back from the axially outermost extent to form a raised edge, said raised edge defining a raised edge plane that is noncoplanar with said first end plane; and a second end coextensively joined to said narrow diameter circumference, said second end defining a second end plane; and a frame connected to each of said plurality of bread bowl bakers. In a preferred embodiment, each of said plurality of bread bowl bakers is manually removable from the frame without tools.

Another object of the invention is to provide a method of baking bread bowls that produces uniform bread bowls. Another object of the invention is to provide a method that is predictable and reproducible, thereby decreasing variance. Another object of the invention is to provide a method that has one or more of the characteristics discussed above but which is which is relatively simple to setup and practice using relatively low skilled workers.

In accordance with another aspect of the invention, these objects are achieved by providing a method of baking bread bowls comprising: providing a bread bowl baker including: a concavo-convex body defining a center axis and including a wide diameter circumference and a narrow diameter circumference: a first end coextensively joined to said wide diameter circumference, said first end i) having an axially outermost extent that defines a first end plane and ii) including a nonplanar cylindrical flange that doubles back from the axially outermost extent to form a raised edge, said raised edge defining a raised edge plane that is noncoplanar with said first end plane; and a second end coextensively joined to said narrow diameter circumference, said second end defining a second end plane; forming a mass of raw bread dough over said concavo-convex body and adjacent said nonplanar cylindrical flange of said bread bowl baker; placing the formed mass of raw bread dough and said bread bowl baker in an oven; heating the formed mass of raw bread dough and said bread bowl baker so as to bake the formed mass of raw bread dough; and removing the resulting baked bread dough and said bread bowl baker from the oven, wherein a shape of the resulting baked bread dough is a function of a shape of said nonplanar cylindrical flange. In a preferred embodiment, the method further comprises i) providing a plurality of bread bowl bakers connected to a frame and ii) forming a mass of raw bread dough adjacent each of said plurality of bread bowl bakers.

Other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore nonlimiting, embodiments illustrated in the drawings accompanying and forming a part of this specification, wherein like reference numerals designate the same elements in the several views, and in which:

FIG. 1 illustrates an isometric view of a first embodiment of a bread bowl baker according to the present invention;

FIG. 1b illustrates a top plan view of the bread bowl baker shown in FIG. 1a;

FIG. 2b illustrates a top plan view of the bread bowl baker shown in FIG. 2a;

FIG. 3b illustrates a top plan view of the bread bowl baker shown in FIG. 3a;

FIG. 10b illustrates a top plan view of the assembly of bread bowl bakers shown in FIGS. 9 and 10a.

DESCRIPTION OF PREFERRED EMBODIMENTS

Figure 1A:
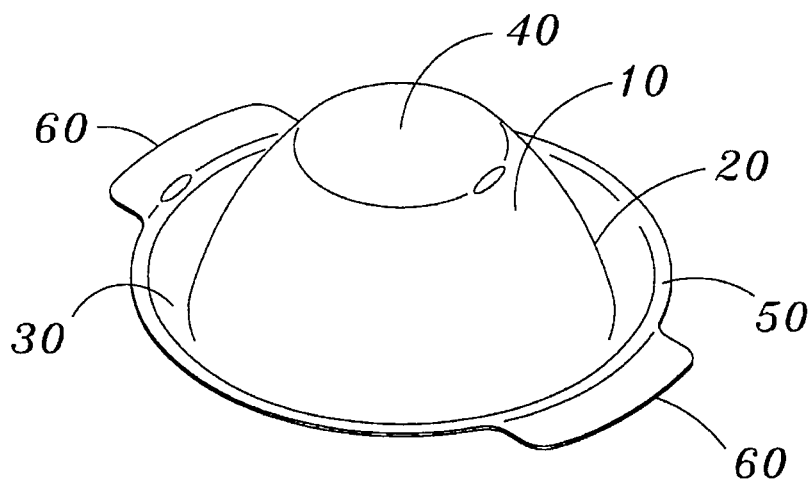

The present invention and the various features and advantageous details thereof are explained more fully with reference to the nonlimiting embodiments described in detail in the following description.

1. System Overview

The above-mentioned requirements are mutually contradicting and cannot be satisfied simultaneously in the case of a bowl with a simple planar cylindrical flange located at the outermost extent of the open end of the bowl. However, it is rendered possible to simultaneously satisfy the above-mentioned requirements to a certain extent by employing a bread bowl baker with a nonplanar cylindrical flange having a raised edge in consideration of the fact that the raised edge provides a trim block during the forming of the raw bread dough and a more uniform distribution of heat during baking.

The raised edge also provides a structure that is more easily gripped when placing or lifting the bread bowl baker because it is spaced apart from the supporting structure of the oven, or other supporting surface. This raised edge can be further provided with optional handles so as to further improve the lifting and placing attributes of the bread bowl baker.

Moreover, a plurality of these bread bowl bakers can be connected to a frame. Forming the raw bread dough and cleaning the bread bowl bakers is facilitated by each of the plurality of bread bowl bakers being manually detachable from the frame without tools.

2. Detailed Description of Preferred Embodiments

Referring to the drawings, it can be seen that the bread bowl baker has a substantially concavo-convex shape. The bread bowl baker is typically substantially cylindrically symmetrical. Pursuant to the present invention, the bread bowl baker defines a cylindrical axis.

The bread bowl baker has a first end that is open. There is a nonplanar cylindrical flange at this first end. The axially outermost extent of the first end defines a first plane. The nonplanar cylindrical flange passes through and doubles back from the axially outermost extent of the first end to form a raised edge. The raised edge defines a raised edge plane that is noncoplanar with the first plane.

As noted above, the nonplanar cylindrical flange and the raised edge provide several advantages. The nonplanar cylindrical flange and the raised edge facilitate the formation of a more uniform bread bowl by providing a symmetry guide during the process of forming raw bread dough around the bread bowl baker. The nonplanar cylindrical flange and the raised edge also permit a more uniform bread bowl to be produced by providing a trim blocking surface obviating the need to remove excess dough after the process of forming is completed. Thus, an advantage of the flared surface and raised edge is to be able to mold a uniform product and not have to remove excess dough.

The nonplanar cylindrical flange and raised edge facilitate the baking of a bread bowl with improved consistency, enhance appearance and better taste by encouraging gases and heat from the oven to circulate more freely around the open first end of the bread bowl baker both during, and after, the process of baking. Without being bound by theory, it is believed that the presence of the nonplanar cylindrical flange and the raised edge encourage gases and heat from the oven to circulate more freely due to the convective-conductive-reflective thermodynamic surface/edge that is symmetrically located around the dough mass during the entire time that the bread bowl is baking, and also after the bread bowl is removed from the oven. These features unexpectedly combine to permit the production of a baked bread bowl that has the advantages of higher uniformity, improved consistency, enhanced appearance and better taste.

The bread bowl baker is optionally provided with handles so as to facilitate loading and unloading the bread bowl baker from the oven. The handles can be rectilinear and/or circular and/or cardioid, as well as angled. The handles are advantageously attached along the raised rim because this keeps the handles spaced away from the bottom of the oven, or oven rack. This mode of attachment reduces heat transfer from the bottom of the oven, or oven rack, into the handles and makes it easier to grasp the handles. These aspects are especially important when removing a hot bread bowl baker from a hot oven. When the handles are attached to the bread bowl baker, they should be located so as to permit the bread bowl baker to be raised and moved in a balanced, open end down condition.

The bread bowl baker is optionally coated on the inside and/or outside with one or more nonstick coatings, such as, for example, TEFLON (i.e., fluorocarbon polymers), (e.g., tetrafluroethylene and fluorinated ethylenepropylene). In an advantageous embodiment, the outer surface of the bread bowl baker is coated with a first nonstick coating that is optimized for release of the baked dough from the bread bowl baker. Further, in this same embodiment, the inner surface of the bread bowl baker, which includes the side of the nonplanar cylindrical flange that faces downward during baking, is coated with a second nonstick coating that is optimized for durability.

Referring to FIG. 1a, the bread bowl baker has a concavo-convex body 10. The concavo-convex body has a first end 20. The first end 20 is open. The first end 20 has a nonplanar cylindrical flange 30. The concavo-convex body also has a second end 40. The second end 40 is closed. This second end can be a wide, flat surface and can define a second plane.

Figure 1B:
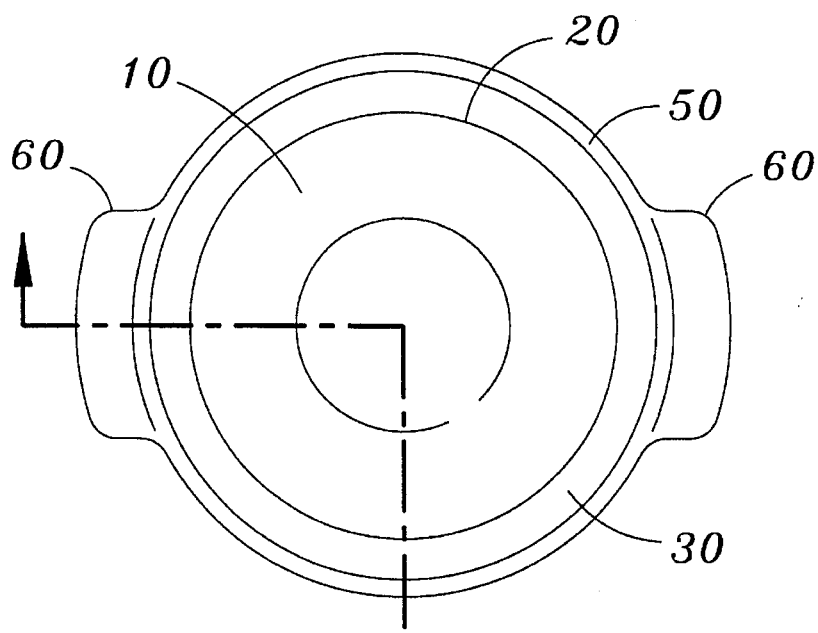

Referring now to FIG. 1b, the nonplanar cylindrical flange 30 can include a widened portion 50. Further, a widened handle portion 60 can be connected to the widened portion 50. The widened handle portion 60 can be integrally formed. It will be appreciated that except for widened handle portion 60, this embodiment of the bread bowl baker is substantially cylindrically symmetrical.

Figure 1C:
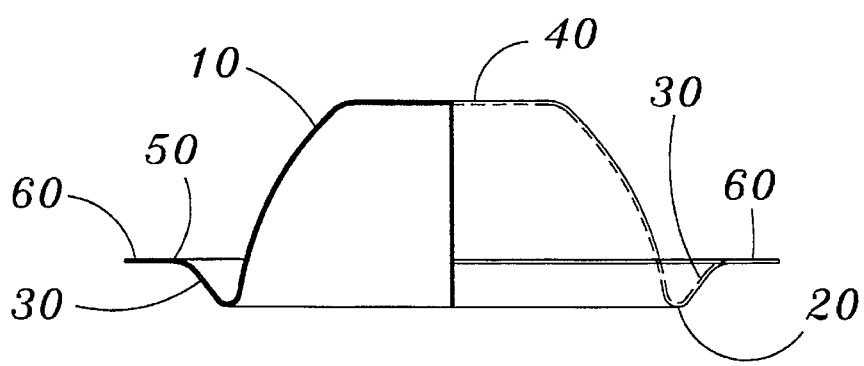
FIG. 1c illustrates a partial sectional view of the bread bowl baker shown in FIGS. 1a and 1b.

Referring now to FIG. 1c, the cross-sectional shape of the nonplanar cylindrical flange 30 can be better appreciated. The nonplanar cylindrical flange 30 passes through first end 20. The nonplanar cylindrical flange continues away from the center axis of the bread bowl baker toward widened portion 50. The nonplanar cylindrical doubles back from the axially outermost extent of the first end to form a raised edge to which the widened portion 50 is attached. The depicted structure thus forms a sinusoidal compound curve. In this embodiment, widened portion 50 and widened handle portion 60 are substantially planar and parallel to second end 40. Second end 40 is preferably flat so that the resulting bread bowl will not tilt or roll easily.

Of course, the overall shape of the bread bowl baker can be changed. For example, the height of the bread bowl baker shown in the sketches can be reduced without changing the width, or the radius of curvature, thereby yielding a shorter, wider bread bowl. The wider base, compared to conventional household bowls, permits the finished bread bowl product to rest flat on a table or plate. With ordinary bowls, bread dough rises in the shape of a sphere and does not rest evenly when placed on a table or plate. Without being bound by theme, it is believed that when it is known that a bread bowl is to be used as a container for a specific type of food that is to be subsequently processed, (e.g., to hold soup that is to be heated), careful interrelated choice among the infinite combinations of height, width and radius of curvature can yield a final dish, (e.g., soup in a bread bowl), that has higher uniformity, improved consistency, enhanced appearance and better taste.

Figure 2A:
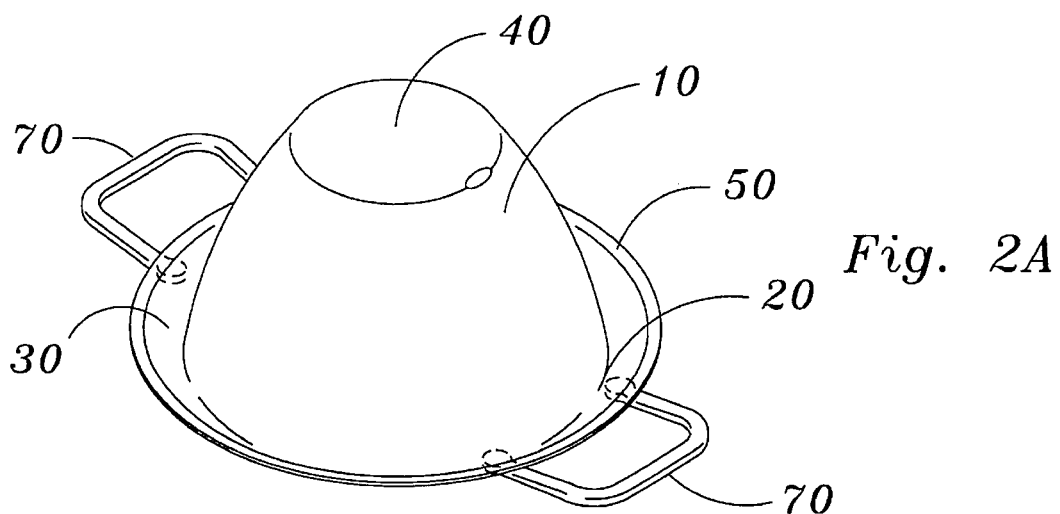
FIG. 2a illustrates a perspective view of a second embodiment of a bread bowl baker according to the present invention.

Referring now to FIG. 2a, a taller embodiment of the bread bowl baker according to the present invention is shown. In this embodiment, rectilinear handles 70 are connected to widened portion 50. In this taller embodiment, the height-to-weight ratio is higher than in the embodiment shown in FIGS. 1a–1c. Referring again to FIG. 2a, it will be appreciated that except for rectilinear handles 70, this embodiment of the bread bowl baker is also substantially cylindrically symmetric.

The height aspect ratio of the bread bowl baker can be tall, (i.e., height to width ratio of greater than 1.25), medium, (i.e., height to width ratio of from 0.75 to 1.25) or short, (i.e, height to width ratio of less than 0.75). When the height aspect ratio of the bread bowl baker is excessively low, the capacity of the resultant bread bowl may be too low. On the other hand, when the height of the bread bowl baker is excessively high, the stability of the resultant bread bowl may be too low.

Figure 2B:
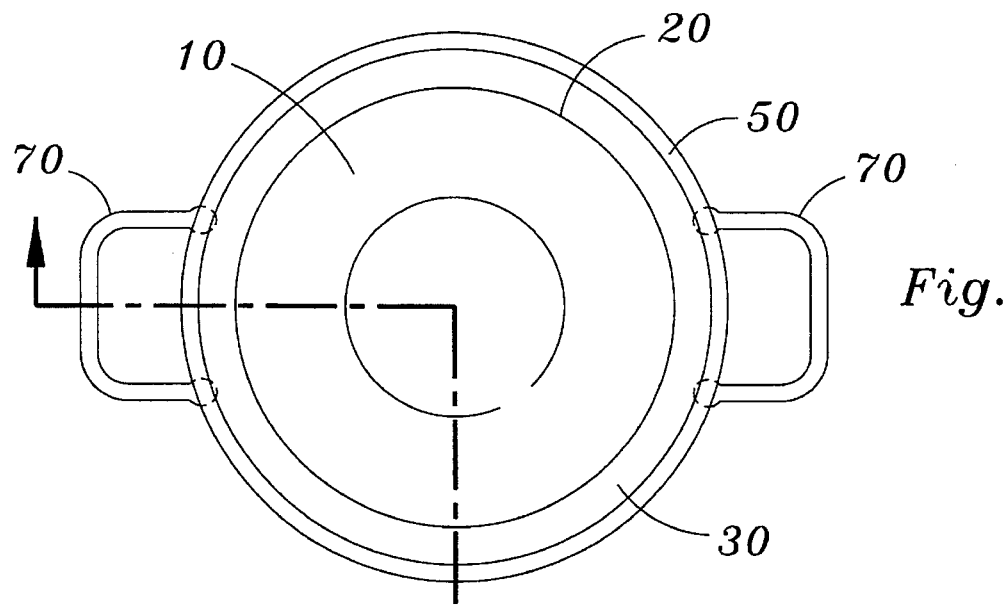

Referring to FIG. 2b, the attachment of rectilinear handles 70 to widened portion 50 will be better appreciated. In a preferred embodiment, both the rectilinear handles and the concavo-convex body are made of aluminum and are welded together. However, rectilinear handles 70 can be integrally formed from any suitable material.

Figure 2C:
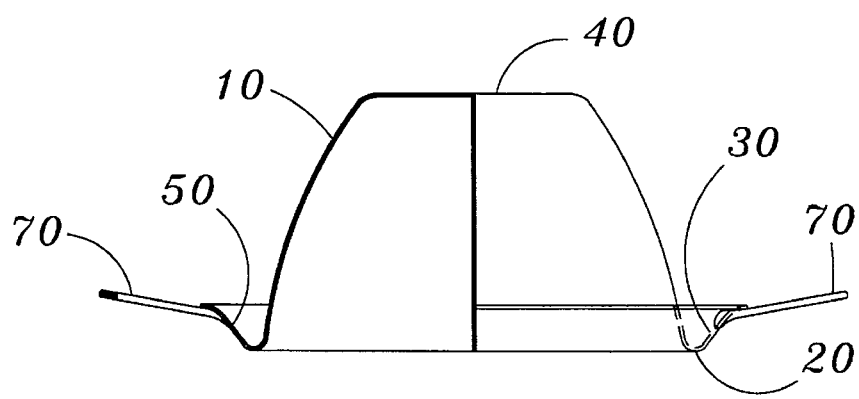
FIG. 2c illustrates a partial sectional view of the bread bowl baker shown in FIGS. 2a and 2b.

Referring now to FIG. 2c, it will be appreciated that rectilinear handles 70 are angled up and away from the center line of the bread bowl baker. This provides a larger gap between the supporting surface upon which the bread bowl baker sits and the bottom of the rectilinear handles 70 so as to permit a pair of human hands, or a tool such as a wooden handle, to reach under and grasp rectilinear handle 70. In this embodiment, the rectilinear handles 70 define an angle of approximately 10° with regard to the plane defined by the first end 20 of the bread bowl baker.

The angular relationship of the handles can be varied. For example, the handles can define an angle of from approximately −10° to approximately 90° with regard to the plane defined by the first end, preferably from approximately 10° to approximately 60°, most preferably 30°.

Figure 3A:
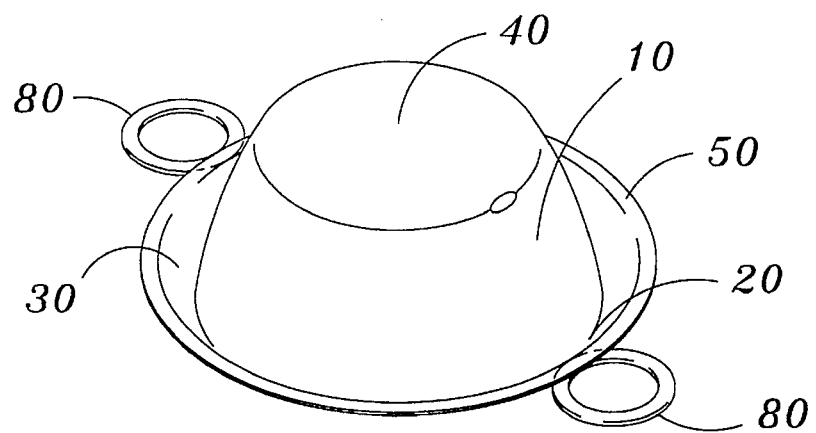
FIG. 3a illustrates a perspective view of a third embodiment of a bread bowl baker according to the present invention.

Referring now to FIG. 3a, a shorter embodiment of the bread bowl baker is shown. In this embodiment, circular handles 80 are connected to widened portion 50.

Figure 3B:
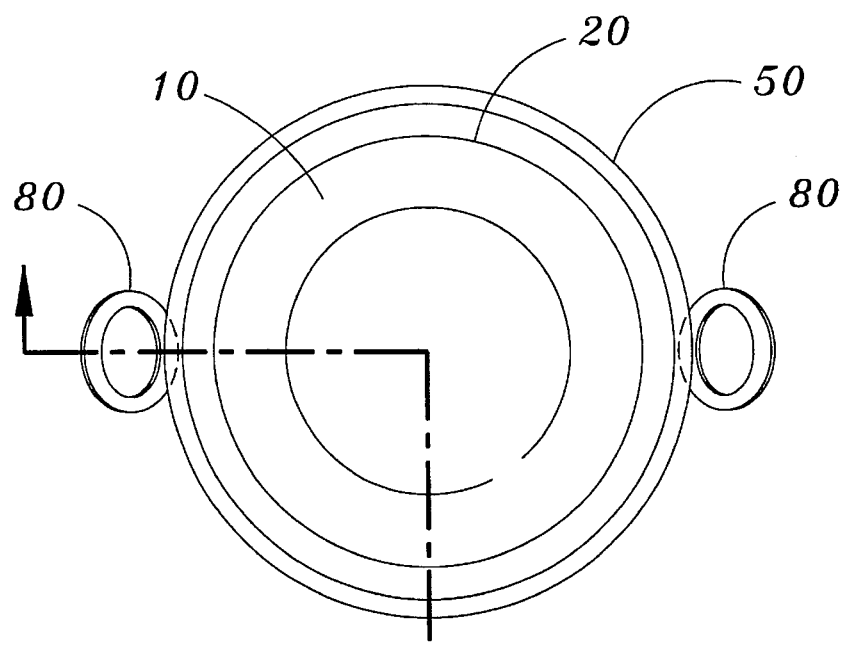

Referring to FIG. 3b, the circular handles 80 are connected to widened portion 50 with rivets that are not shown. However, the handles can be integrally formed.

Figure 3C:
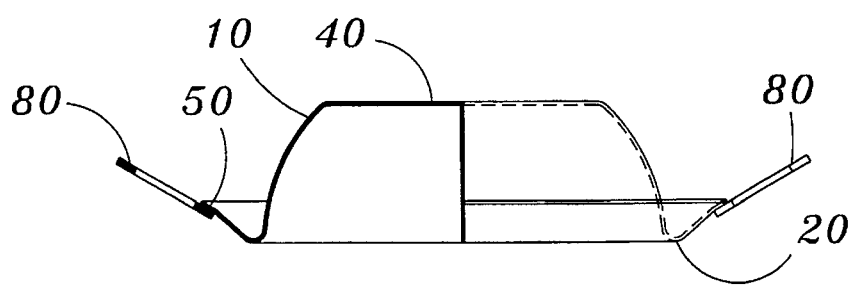
FIG. 3c illustrates a partial sectional view of the bread bowl baker shown in FIGS. 3a and 3b.

Referring to FIG. 3c, it will be appreciated that circular handles 80 are angled up and away from the center axis of the bread bowl baker. In this embodiment, the circular handles 80 define an angle of approximately 30° with regard to the plane defined by the first end 20 of the bread bowl baker.

A careful comparison of FIGS. 1c, 2c and 3c will reveal a variation in the radius of curvature ratio of the concavo-convex wall of the bread bowl bakers. The radius of curvature ratio of the concavo-convex wall of the bread bowl baker (i.e., radius of curvature to largest outside diameter) can be that of gradual, (i.e., radius of curvature ratio of greater than 1.0), medium, (i.e., radius of curvature ratio of from 0.2 to 1.0), or abrupt, (i.e., radius of curvature ratio of less than 0.2). Depending on the diameters of the first and second ends, if the curvature ratio of the bread bowl baker is excessively high, the resultant bread bowls may tend to tip over. Similarly, if the curvature ratio is excessively low, the resultant bread bowl may tend to fracture and leak along the joint between the wall and the base because such a joint will be approaching a right angle.

Figure 4A:
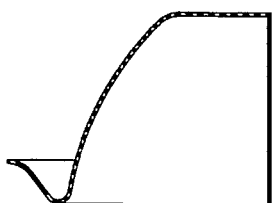
FIGS. 4a–4d show sectional views of alternative embodiments of the bread bowl bakers according to the present invention.
Figure 4B:
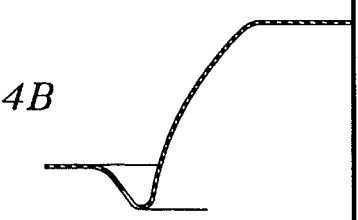
Figure 4C:
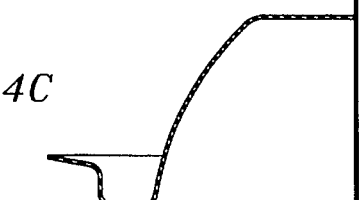
Figure 4D:
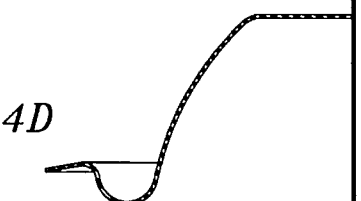

Referring now to FIGS. 4a–4d, alternative embodiments for the nonplanar cylindrical flange 30 of the present invention are shown. In each of these embodiments, the nonplanar cylindrical flange passes through and doubles back from second end 20 (and away from the bottom center of the bread bowl baker) to form a raised edge that defines a raised edge plane. The nonplanar cylindrical flange 30 can be flat, rounded, angular, stepped rectilinear and/or compound sinusoidal. In FIG. 4a, the nonplanar cylindrical flange passes through the outermost axial extent of the first end, moves up and away sinusoidally and terminates in a truncated widened portion. In FIG. 4b, the nonplanar cylindrical flange again passes through the outermost axial extent, moves up and away sinusoidally, but terminates in a widened handle portion. The widened handle portion is horizontal with regard to the plane defined by the first end. In FIG. 4c, the nonplanar cylindrical flange passes through the outermost axial extent, moves perpendicularly from the center line of the bread bowl baker and then deflects sharply upward in a direction parallel to the center line of the bread bowl baker whereupon it again deflects acutely, and nonorthogonally, away from the center line. In FIG. 4d, the nonplanar cylindrical flange moves along a gradual radius up and away from the bottom center line of the bread bowl baker and then moves obtusely, and nonorthogonally away from the center line of the bread bowl baker.

Figure 5A:
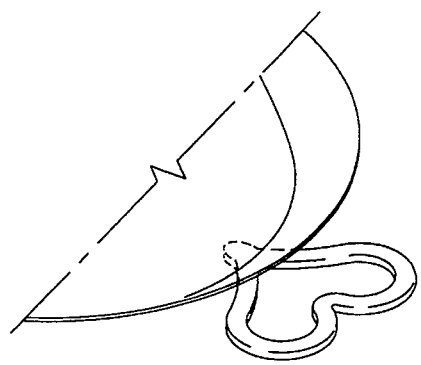
FIGS. 5a–5d illustrate perspective view of alternative embodiments of handles attached to bread bowl bakers according to the present invention.
Figure 5B:
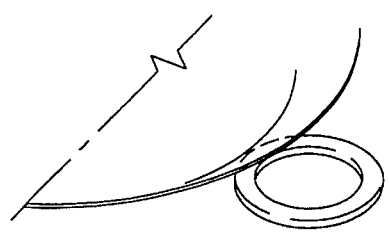
Figure 5C:
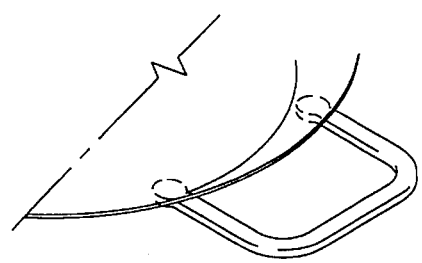
Figure 5D:
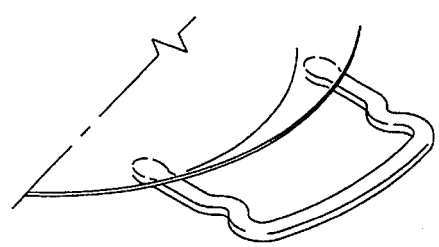

Referring to FIGS. 5a–5d, various handle embodiments for attachment to the bread bowl baker according to the present invention can be seen. In FIG. 5a, a heart-shaped, (i.e., cardioid) handle is shown. In FIG. 5b, a circular handle is shown. In FIG. 5c, a rectilinear handle is shown. In FIG. 5d, a more complex rectilinear handle is shown which approximates the silhouette of a slice of a loaf of bread.

Conveniently, the bread bowl bakers of the present invention can be made of any oven suitable material. For the manufacturing operation, it is moreover an advantage to employ an aluminum alloy.

Conveniently, the fabrication of the present invention can be carried out by using any forming method. For the manufacturing operation, it is moreover an advantage to employ a spun aluminum method.

While not being limited to any particular optimization methodology, preferred embodiments of the bread bowl baker can be identified one at a time by testing for uniformity of the baked product. The test for uniformity can be carried out without undue experimentation by the use of the simple and conventional color tests. Among the other ways in which to seek embodiments having the attribute of uniformity, guidance toward the next preferred embodiment can be based on the presence of consistent texture.

A plurality of the above-discussed bread bowl bakers can be joined together into a single assembly with a frame. Such an apparatus permits the dough for several bread bowls to be simultaneously formed and baked, thereby increasing efficiency.

Such a framework can be an encircling rectilinear frame work and is advantageously constructed of welded aluminum or welded alloy. During baking in the oven, the encircling rectilinear framework can be above the base of the oven because the framework is preferably connected to the raised rims of the bread bowl bakers. Therefore, the framework also provides a convective-conductive-reflective thermodynamic surface within the oven while the bread bowl(s) are baking and after removal from the oven. Plural bread bowl bakers are advantageously not joined to the same frame member at the same location so as to provide thermal stability and thermal isolation between the bread bowl bakers.

Figure 6:
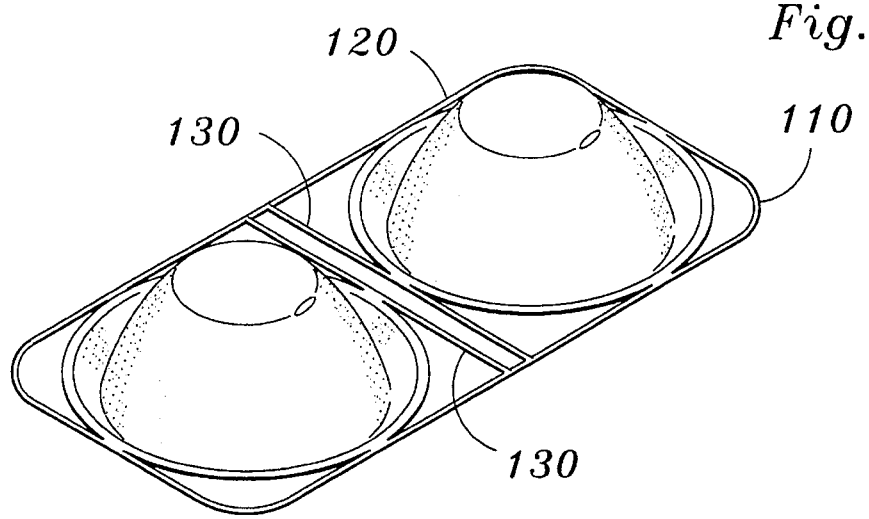
FIG. 6 illustrates a perspective view of a first embodiment of an assembly of bread bowl bakers according to the present invention.

Referring to FIG. 6, an assembly of two bread bowl bakers according to the present invention can be seen. The assembly includes an encircling framework 110. The encircling framework includes an outer encircling band 120. Each of the bread bowl bakers is connected to a separating beam 130 that are in turn connected to outer encircling band 120 at each of their ends.

Figure 7:
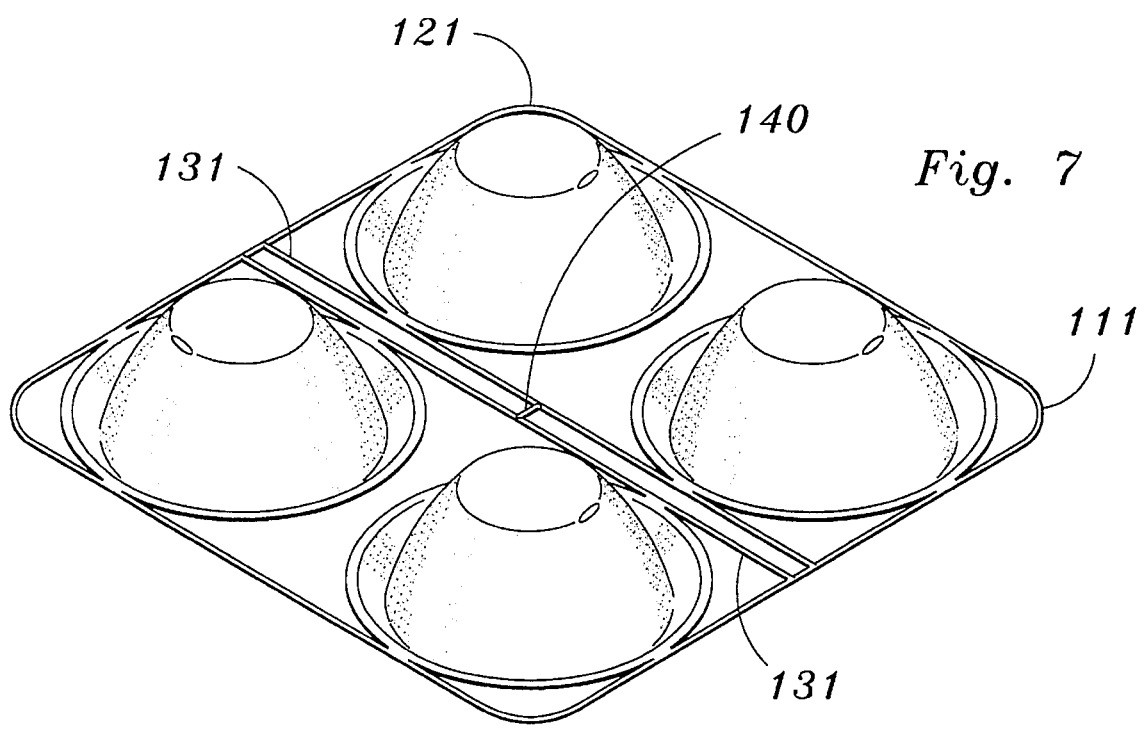
FIG. 7 illustrates a perspective view of a second embodiment of an assembly of bread bowl bakers according to the present invention.

Referring to FIG. 7, an assembly of four bread bowl bakers according to the present invention can be seen. This assembly includes an encircling framework 111 that is attached to each of the bread bowl bakers at two points along their widened portion. The assembly also includes two separating beams 131. Separating beams 131 are braced with a spacer beam 140.

As with a single bread bowl baker, the framework of a plurality of bread bowl bakers can include one or more handles which facilitate loading and unloading the assembly from the oven. The attachment location of the handle(s) to the flamework should permit the assembly to be raised and moved in a balanced condition with the open end of the bread bowls facing down so that the dough remains in place.

FIGS. 6 and 7 show an encircling framework as part of the structure for holding a plurality of bread bowls together, but the structure for holding the plurality of bread bowls together can be any other structure capable of performing the function of holding the bread bowls together, including, by way of example a perpendicular wire framework, a conveyor belt, or even a perforated tube.

In a preferred embodiment, the framework is a supporting wire frame work and is advantageously constructed of welded stainless steel. Such a supporting wire framework can hold the outermost axial extent of the first end of the bread bowl bakers up and away from the base of the oven, or other surface. During baking in the oven, some portions of such a supporting wire framework are adjacent the base of the oven. However, other portions of the supporting wire flamework are not and they also provide convective-conductive-reflective thermodynamic surfaces within the oven while the bread bowl(s) are baking and after removal from the oven. Again, the bread bowl bakers held by such a supporting wire flamework are advantageously not directly adjacent to one another so as to provide thermal stability and thermal isolation between the bread bowl bakers.

A significant advantage of such a supporting flamework is that the individual bread bowl bakers can be removed from the supporting flamework without tools. This feature permits the assembly to be reconfigured by interchanging different size and/or shape bread bowl bakers. This feature also makes forming the raw bread dough more convenient. This feature also makes cleaning the bread bowls and the supporting flamework more efficient.

Figure 8:
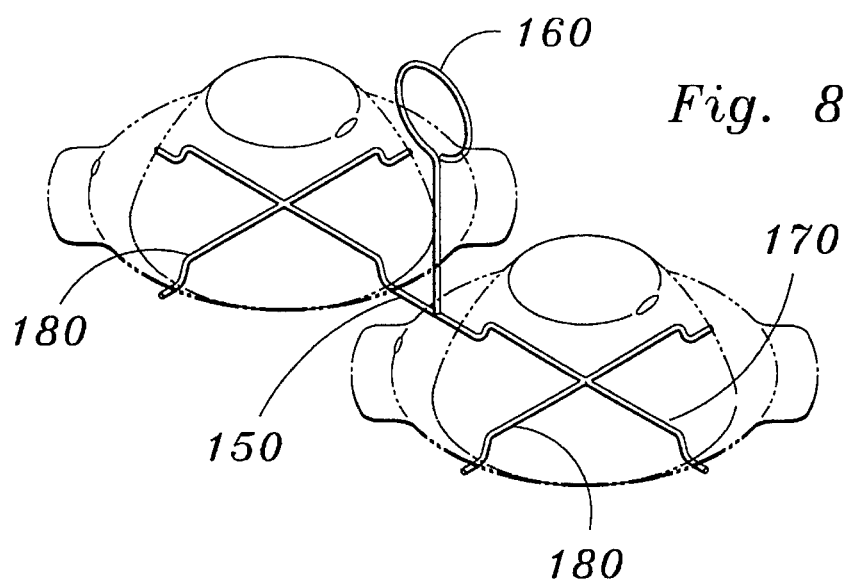
FIG. 8 illustrates a perspective view of a third embodiment of an assembly of bread bowl bakers according to the present invention.

Referring to FIG. 8, another assembly of two bread bowl bakers according to the present invention can be seen. This assembly includes a supporting wire flamework 150. Supporting wire flamework 150 includes handle 160. Supporting wire flamework 150 includes a center piece 170. Support pieces 180 are connected to center piece 170 at right angles. As noted above, the bread bowl bakers can be readily removed from supporting wire flamework 150 so as to facilitate both forming of the dough and cleaning of the rack.

Figure 9:
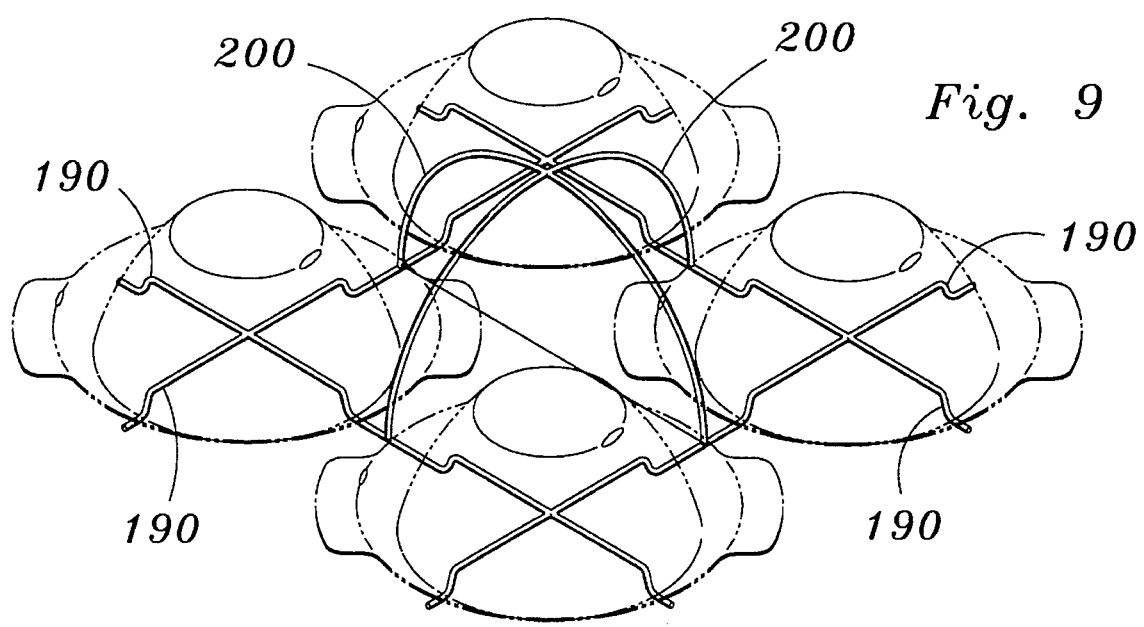
FIG. 9 illustrates a perspective view of a fourth embodiment of an assembly of bread bowl bakers according to the present invention.

Referring to FIG. 9, another assembly of four bread bowl bakers according to the present invention is shown. This embodiment includes four perimeter pieces 190 that are connected to one another at right angles. This assembly also includes two handle pieces 200 that are attached at their ends to perimeter pieces 190.

Figure 10A:
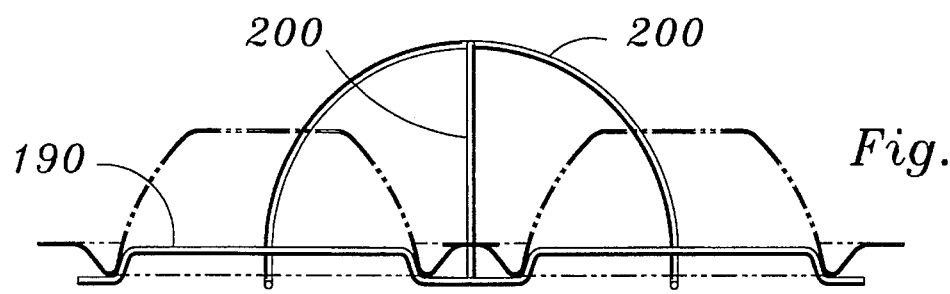
FIG. 10a illustrates an elevational view of the assembly of bread bowl bakers shown in FIG. 9.

Referring to FIG. 10a, it will be appreciated that handle pieces 200 are substantially semicylindrical. During use, the bread bowl bakers sit atop perimeter pieces 190, thereby being spaced apart from the base of the oven or other surface. The bread bowl bakers are separated from one another by handle pieces 200.

Figure 10B:
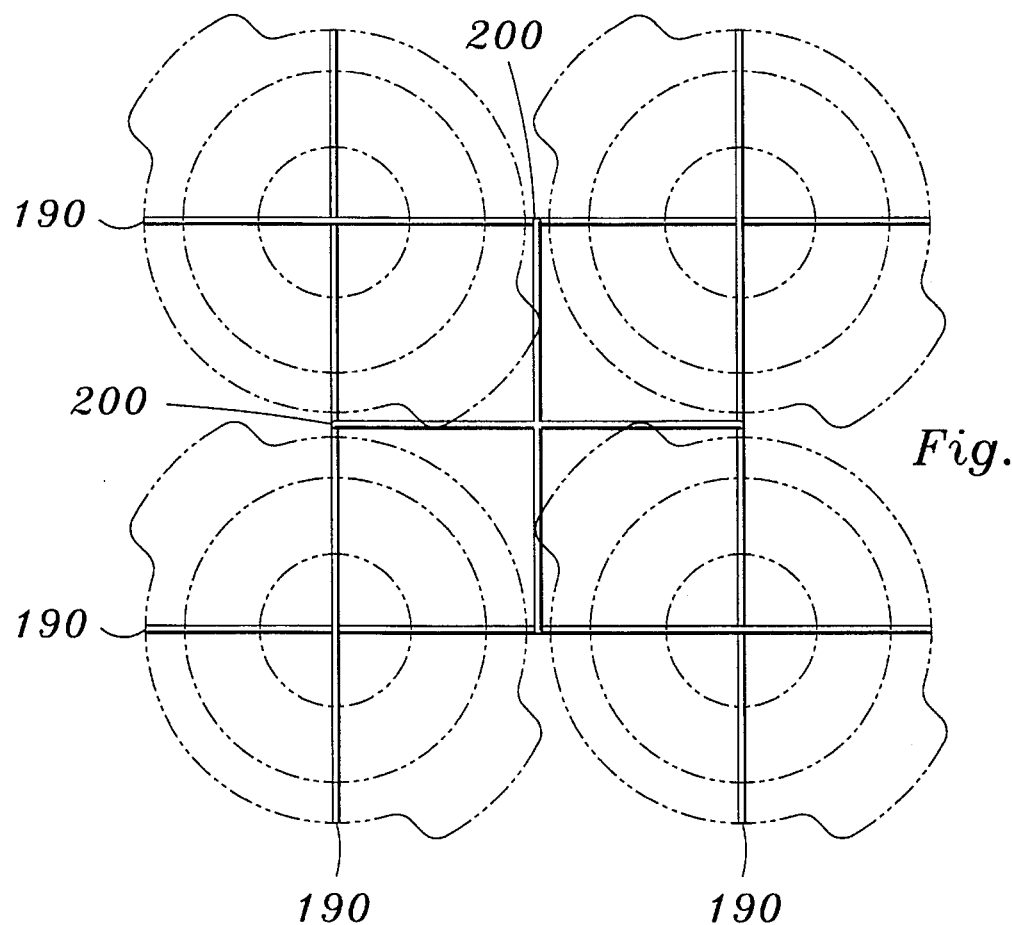

Referring now to FIG. 10b, the simple assembly of perimeter pieces 190 and handle pieces 200 will be appreciated. Although in this embodiment perimeter pieces 190 and handle pieces 200 are formed from circular cross-section wire, these structures can be fabricated from any convenient stock material.

During use, an individual bread bowl baker is positioned with the open end down on top of a supporting surface, such as a table. Raw bread dough is then formed over the closed end, typically, although not necessarily, by hand. The bread bowl baker, together with the raw bread dough, is then placed into an oven for baking. Finally, the bread bowl baker, together with the baked bread dough, is removed from the oven for cooling.

All the disclosed embodiments are useful in conjunction with forming and baking bread dough for the purpose of producing a bread bowl, or the like. There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the bread bowl baker could be enhanced by providing additional flanges. Similarly, although aluminum alloy and/or stainless steel is preferred for the concavo-convex body, any suitable structural material could be used in its place, such as, for example, mild steel, copper, brass, cast iron or even glass or ceramic, such as stoneware. In addition, although aluminum alloy and/or stainless is preferred for the frame, the individual framework components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration, which support raw bread dough in an oven so as to provide a baked bread bowl. Further, although the bread bowls and bread bowl assemblies are described herein as physically separate modules, it will be manifest that the bowls and assemblies may be integrated into the apparatus with which it is associated, such as, for example, a gas oven. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended subclaims.

What is claimed is:

1. A bread bowl baker comprising:
   a concavo-convex body including a wide diameter circumference and a narrow diameter circumference;
   a first end coextensively joined to said wide diameter circumference, said first end i) having an axially outermost extent that defines a first end plane and ii) including a nonplanar cylindrical flange that a) doubles back from the axially outermost extent to form a raised edge, said raised edge defining a raised edge plane that is noncoplanar with said first end plane and b) includes an outer perimeter that is at least partially cylindrical;
   a second end coextensively joined to said narrow diameter circumference, said second end defining a second end plane;
   a widened end portion coextensively joined to said nonplanar cylindrical flange; and
   a plurality of handles adjacent said widened end portion, wherein said plurality of handles include a first integrally formed handle and a second integrally formed handle.

2. The bread bowl baker of claim 1, wherein said second end is substantially planar.

3. The bread bowl baker of claim 2, wherein said nonplanar cylindrical flange includes a sinusoidal compound curve.

4. The bread bowl baker of claim 3, wherein said widened end portion is nonorthogonally coextensively joined to said nonplanar cylindrical flange.

5. The bread bowl baker of claim 1, wherein said first integrally formed handle defines a first handle angle of from approximately −10° to approximately 60° with regard to said first end plane and said second integrally formed handle defines a second handle angle of from approximately −10° to approximately 60° with regard to said first end plane.

6. The bread bowl baker of claim 1, further comprising a first handle that defines a first handle angle of from approximately −10° to approximately 90° with regard to said first end plane and a second handle that defines a second handle angle of from approximately −5° to approximately 90° with regard to said first end plane.

7. The bread bowl baker of claim 6, wherein i) said first handle is selected from the group consisting of circular, rectilinear and cardioid and 2) said second handle is selected from the group consisting of circular, rectilinear and cardioid.

8. The bread bowl baker of claim 1, further comprising a nonstick material coated on i) an outer diameter surface of said concavo-convex body and ii) an outer surface of said second end, said nonstick material including at least one member selected from the group consisting of tetrafluroethylene and fluorinated ethylene-propylene.

9. An apparatus for making bread bowls comprising:
   a plurality of bread bowl bakers, each of said plurality of bread bowl bakers including:

a concavo-convex body including a wide diameter circumference and a narrow diameter circumference;

a first end coextensively joined to said wide diameter circumference, said first end i) having an axially outermost extent that defines a first end plane and ii) including a nonplanar cylindrical flange that doubles back from the axially outermost extent to form a raised edge, said raised edge defining a raised edge plane that is noncoplanar with said first end plane; and a second end coextensively joined to said narrow diameter circumference, said second end defining a second end plane; and a frame connected to each of said plurality of bread bowl bakers.

10. The apparatus of claim 9, wherein each of said plurality of bread bowl bakers is manually removable from said frame without tools.

11. The apparatus of claim 10, wherein said frame includes an elongated support beam having two orthogonally formed portions for internal engagement with two bread bowl bakers.

12. The apparatus of claim 11, wherein said frame includes four elongated support beams, each of said four elongated support beams having two orthogonally formed portions for internal engagement with two bread bowl bakers, said four elongated support beams being joined together at right angles so as to form a frame for a total of four bread bowl bakers.

13. The apparatus of claim 11, further comprising a handle connected to said frame.

14. The apparatus of claim 9, wherein said frame includes an encircling framework that is connected to each of said plurality of bread bowl bakers.

15. The apparatus of claim 14, wherein said frame includes separating beams for providing thermal isolation.

16. A method comprising:

providing a bread bowl baker including:

a concavo-convex body defining a center axis and including a wide diameter circumference and a narrow diameter circumference;

a first end coextensively joined to said wide diameter circumference, said first end i) having an axially outermost extent that defines a first end plane and ii) including a nonplanar cylindrical flange that doubles back from the axially outermost extent to form a raised edge, said raised edge defining a raised edge plane that is noncoplanar with said first end plane; and a second end coextensively joined to said narrow diameter circumference, said second end defining a second end plane;

forming a mass of raw bread dough over said concavo-convex body and adjacent said nonplanar cylindrical flange of said bread bowl baker;

placing the formed mass of raw bread dough and said bread bowl baker in an oven;

heating the formed mass of raw bread dough and said bread bowl baker so as to bake the formed mass of raw bread dough; and removing the resulting baked bread dough and said bread bowl baker from the oven, wherein a shape of the resulting baked bread dough is a function of a shape of said nonplanar cylindrical flange.

17. The method of claim 16, further comprising i) providing a plurality of bread bowl bakers connected to a frame and ii) forming a mass of raw bread dough adjacent each of said plurality of bread bowl bakers.

18. The method of claim 17, wherein each of said plurality of bread bowl bakers is manually removable from said frame without tools and further comprising connecting each of said plurality of bread bowl bakers to said frame after the step of forming and before the step of placing.

* * * * *